US007895267B2

(12) United States Patent
Millican et al.

(10) Patent No.: US 7,895,267 B2
(45) Date of Patent: Feb. 22, 2011

(54) EXTENSIBLE METHOD AND SYSTEM FOR PERFORMING MANAGEMENT OPERATIONS ON KNOWN AND UNKNOWN TARGETS

(75) Inventors: Arthur Millican, Granite Falls, WA (US); Jonathan Fletcher, Tekoa, WA (US)

(73) Assignee: Intermec IP Corporation, Everett, WA (US)

( * ) Notice: Subject to any disclaimer, the term of this patent is extended or adjusted under 35 U.S.C. 154(b) by 192 days.

(21) Appl. No.: 12/252,141

(22) Filed: Oct. 15, 2008

(65) Prior Publication Data

US 2009/0112979 A1 Apr. 30, 2009

Related U.S. Application Data

(60) Provisional application No. 60/982,869, filed on Oct. 26, 2007.

(51) Int. Cl.
  *G06F 15/16* (2006.01)
(52) U.S. Cl. .................... 709/203; 707/758; 726/29; 702/188
(58) Field of Classification Search .............. 709/203, 709/223; 707/758; 702/188; 726/29
  See application file for complete search history.

(56) References Cited

U.S. PATENT DOCUMENTS

| 5,758,342 A | * | 5/1998 | Gregerson | .................. 707/758 |
| 6,167,358 A | * | 12/2000 | Othmer et al. | .............. 702/188 |
| 2008/0134347 A1 | * | 6/2008 | Goyal et al. | .................. 726/29 |

* cited by examiner

*Primary Examiner*—Tammy T Nguyen
(74) *Attorney, Agent, or Firm*—Shook Hardy Bacon LLP (57) ABSTRACT

This invention provides an extensible method for performing management operations on known and unknown targets. The extensible method is implemented on a fully extensible system where management software and triggers that cause these management operations to be run are easily extended in the field. The triggers may include information indicating a change in inventory, product state, or an event, and may originate directly from a product or from an information store containing information about installed products. The management software facilitates mining this information, parsing the information through a manifest of the triggers, and selecting functions to determine if a management operation should be executed, and if so, which management operation. Generally, the management software executes the selected management operation.

19 Claims, 7 Drawing Sheets

```
var fso;
var fp;
var iArgCnt;
var loopcnt;
fso = WScript.CreateObject("Scripting.FileSystemObject");
fp = fso.CreateTextFile("LogPassedParmsOut.txt", 1);
iArgCnt = WScript.Arguments.Count();
for(loopcnt=0; loopcnt < iArgCnt; loopcnt++)
{
    fp.WriteLine("Arg-" + loopcnt + " == " + WScript.Arguments(loopcnt));
}
fp.Close();
WScript.Quit(0);
```

*FIG. 3.*

```
<DevInfo Action="Notify">
<Subsystem Name="SS_Client">
  <Group Name="Reasons">
    <Field Name="Reason1">SS Discover Event</Field>
  <Group Name="Identity">
    <Field Name="ServerVersion">3.0</Field>
    <Field Name="Version">5.20.00.0330</Field>
    <Field Name="Type">C</Field>
    <Field Name="Family">N</Field>
    <Field Name="Model">3</Field>
    <Field Name="HardwareConfiguration">CN3A2K841G5E200</Field>
    <Field Name="UniqueId">CN3A21590600351</Field>
    <Field Name="IqQueueName">SS_CLIENT</Field>
    <Field Name="IqCoreName">CN3A21590600351</Field>
    <Field Name="IPAddress">136.179.84.75</Field>
    <Field Name="SSConfigDir">\SmartSystems\SSConfigDir</Field>
  <Group Name="Ready-to-Work">
    <Field Name="State">2</Field>
    <Field Name="Reason">TE2000 has not connected to host 136.179.84.200</Field>
    <Field Name="Time">2005/06/12:18:34:15.000</Field>
<Group Name="Subsystems" Instance="Device">
  <Group Name="Group" Instance="Info">
    <Field Name="Item" Instance="Manufacture Date">
    <Field Name="Value">08/08/2006</Field>
    <Field Name="Type">String</Field>
    <Field Name="Item" Instance="Service Date">
    <Field Name="Value">08/08/2006</Field>
    <Field Name="Type">String</Field>
<Group Name="Subsystems" Instance="SSFileTransfer">
  <Group Name="Group" Instance="Info">
    <Field Name="Item" Instance="Multicast Client Version">
    <Field Name="Value">v1.1.9</Field>
    <Field Name="Type">String</Field>
```

```xml
<Group Name="Subsystems" Instance="SSMessage">
  <Group Name="Item" Instance="Version">
    <Field Name="Value">1.0.0</Field>
  <Group Name="Subsystems" Instance="GPS">
    <Group Name="Group" Instance="Stats">
      <Group Name="Item" Instance="Timestamp">
        <Field Name="Value">0</Field>
        <Field Name="Type">String</Field>
      <Group Name="Item" Instance="Satellite Cnt">
        <Field Name="Value">0</Field>
        <Field Name="Type">String</Field>
      <Group Name="Item" Instance="Latitude">
        <Field Name="Value">0</Field>
        <Field Name="Type">String</Field>
      <Group Name="Item" Instance="Longitude">
        <Field Name="Value">0</Field>
        <Field Name="Type">String</Field>
      <Group Name="Item" Instance="Heading">
        <Field Name="Value">0</Field>
        <Field Name="Type">String</Field>
      <Group Name="Item" Instance="Speed">
        <Field Name="Value">0</Field>
        <Field Name="Type">String</Field>
      <Group Name="Item" Instance="Elevation">
        <Field Name="Value">0</Field>
        <Field Name="Type">String</Field>
    <Group Name="Group" Instance="Info" />
<Group Name="Subsystems" Instance="AutoDeploy">
  <Group Name="Group" Instance="Stats" />
  <Group Name="Group" Instance="Info">
    <Group Name="Item" Instance="Settings Installed">
      <Field Name="Value">0</Field>
      <Field Name="Type">Number</Field>
```

400

430

```xml
<Group Name="Subsystems" Instance="Battery">
  <Group Name="Group" Instance="Stats">
    <Item Name="Item" Instance="Main Battery Charge Remaining">
      <Field Name="Value">100</Field>
    </Item>
    <Item Name="Item" Instance="Main Battery Status">
      <Field Name="Value">External Power - Charging</Field>
    </Item>
    <Item Name="Item" Instance="Backup Battery Charge Remaining">
      <Field Name="Value">100</Field>
    </Item>
    <Item Name="Item" Instance="Backup Battery Status">
      <Field Name="Value">External Power - Charging</Field>
    </Item>
  </Group>
  <Group Name="Group" Instance="Info" />
</Group>
<Group Name="Subsystems" Instance="System">
  <Group Name="Group" Instance="Stats" />
  <Group Name="Group" Instance="Info">
    <Item Name="Item" Instance="OS Version">
      <Field Name="Value">5.1.478</Field>
    </Item>
    <Item Name="Item" Instance="FirmwareVersion">
      <Field Name="Value">3.20.13.0019</Field>
    </Item>
    <Item Name="Item" Instance="SSPBVersion">
      <Field Name="Value">5.25.05.0219 (6/4/2007)</Field>
    </Item>
    <Item Name="Item" Instance="SSClientVersion">
      <Field Name="Value">3.20.00.0176</Field>
    </Item>
  </Group>
</Group>
<Group Name="Subsystems" Instance="Storage">
  <Group Name="Group" Instance="Stats">
    <Item Name="Item" Instance="Storage Remaining">
      <Field Name="Value">42921472</Field>
    </Item>
  </Group>
  <Group Name="Group" Instance="Info" />
</Group>
<Group Name="Subsystems" Instance="Memory">
  <Group Name="Group" Instance="Stats">
    <Item Name="Item" Instance="Memory Remaining">
      <Field Name="Value">9054656</Field>
    </Item>
    <Item Name="Item" Instance="Memory Load">
      <Field Name="Value">21</Field>
```

FIG. 4C.

EXTENSIBLE METHOD AND SYSTEM FOR PERFORMING MANAGEMENT OPERATIONS ON KNOWN AND UNKNOWN TARGETS

CROSS-REFERENCE TO RELATED APPLICATIONS

This application claims the benefit of U.S. Provisional Application No. 60/982,869, filed Oct. 26, 2007, entitled "EXTENSIBLE METHOD AND SYSTEM FOR PERFORMING MANAGEMENT OPERATIONS ON KNOWN AND UNKNOWN TARGETS," herein incorporated by reference.

TECHNICAL FIELD

The present invention relates to the field of software management, and in particular, to an extensible system for performing management operations on remote software targets.

BACKGROUND OF THE INVENTION

Often, operating characteristics of products (e.g., software) installed on equipment (e.g., mobile devices) being sold by a supplier, even within a single product line, may vary. Further, suppliers regularly alter these characteristics of their products in the field when customizing their products according to customer requirements. For example, management operations are a product characteristic that are typically defined subsequent to the product being distributed in the field. This is especially true with regard to products related to automatic data collection (ADC). As a result, this variation of product characteristics greatly complicates performing remote management operations on the products.

SUMMARY OF THE INVENTION

The present invention generally relates to an extensible system and method for performing management functions on known and unknown products that are targeted by a management utility. The system for performing the management functions generally manipulates aspects of operating systems, firmware, applications, and data files installed in a product (e.g., software, operating system, platform, and the like) accommodated by targeted devices independent of a type of the particular product or inherent product characteristics. Further, this management capability is independent of the product's device hardware platform, operating system, network transport utilized by the target device, and an identity of the product itself. The system and method of the present invention mines messages from the target device for information indicating a change in inventory, product state, or an event for the device. Upon receiving the proper information, the system parses the information against predefined queries that are accessible thereto. The system may then select functions (e.g., stored in a file system of a server) based on predefined queries that are determined to correspond with the received information, to determine if a management function should be run. If appropriate, the system runs the management function on the product or the target device itself.

BRIEF DESCRIPTION OF THE SEVERAL VIEWS OF THE DRAWINGS

The present invention is described in detail below with reference to the attached drawing figures, wherein:

FIGS. 4A-4C illustrate an exemplary message provided from a target device, in accordance with an embodiment of the present invention.

DETAILED DESCRIPTION OF THE INVENTION

The present invention provides an extensible method for performing management functions on known and unknown products (e.g., software) installed on target devices based on information provided by, or stored in association with, the target devices. The present invention is directed to implementing management functions upon detecting triggers that cause the management functions to be extended to a variety of target devices the field. The system for performing the management functions of the present invention is indicated generally at reference numeral 100 of FIG. 1. The system 100 can manage an operating system, firmware, applications, data files, and the like, on the target device, or any other product, independent of a type of a particular product or its characteristics. Further, this management capability is independent of the target device hardware platform, operating system, network transport utilized by the target device, and an identity of the target device itself.

Figure 1:
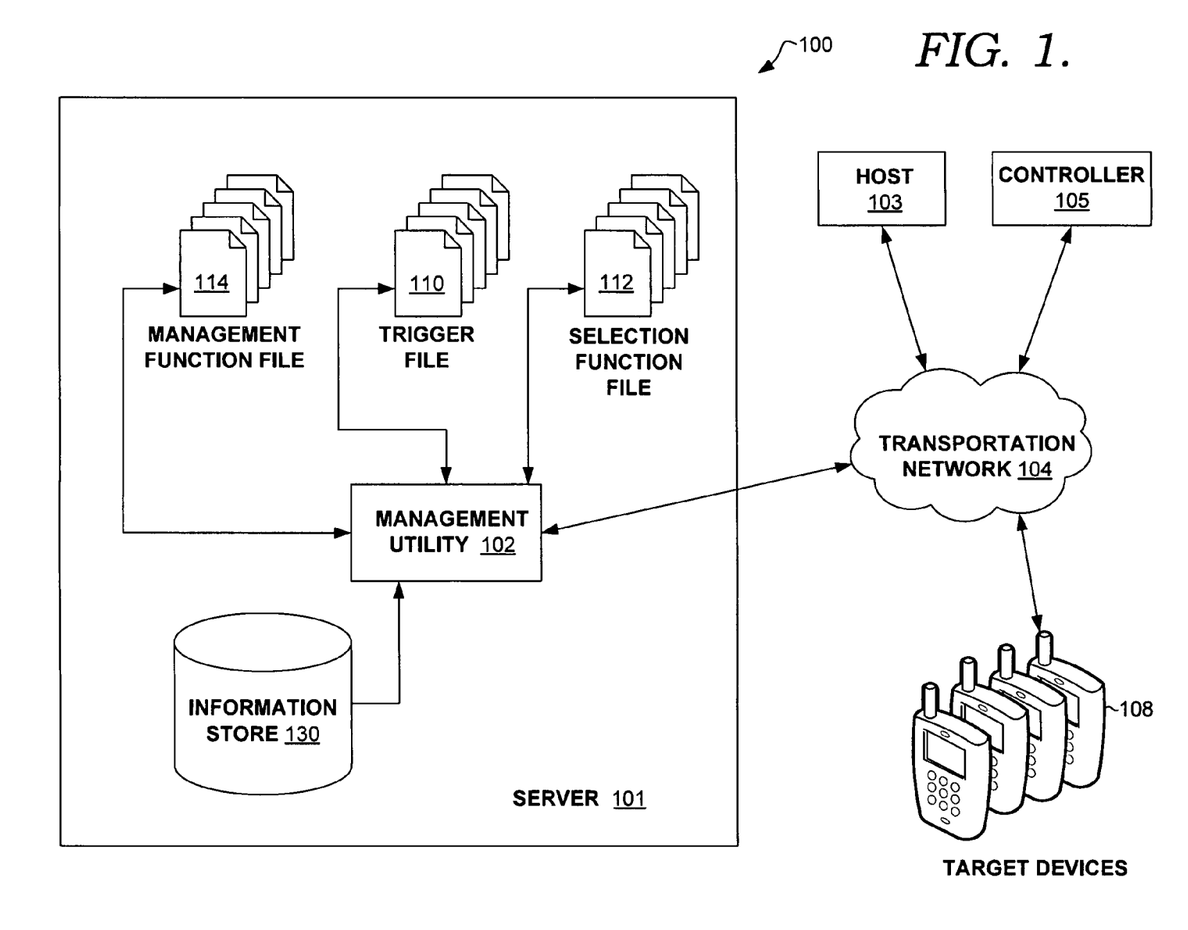
FIG. 1 is a schematic diagram of an exemplary architecture of a system suitable for use in implementing the present invention.

The system 100 will now be described with reference to FIG. 1. Generally, FIG. 1 illustrates a schematic diagram that shows an exemplary architecture of the system 100, which is suitable for use in implementing the present invention. Initially, the system 100 of the present invention mines for information indicating a change in inventory, product state, or an event at one or more target devices 108 within the scope of the system 100. In one instance, mining is performed by monitoring one or more of the target devices 108. By way of example, monitoring may include actively contacting the target device 108 (e.g., sending regular communications), or passively scanning the target device 108 for data of interest.

The system 100 of the present invention provides for other various methods of mining data that are not described above. In embodiments, the information mined for use by the system 100 may originate directly from the target device 108 or from an information store 130 containing information about installed items on the target devices 108. Generally, the mined information may be saved, at least temporarily, in an information store 130 for later extraction, or the system 100 may immediately act on the mined information, such as for example, a modification to a state or inventory of the target device 108. In addition, mining may comprise processing the information extracted or received from the target devices 108. In an exemplary embodiment, one process encompassed by mining this information may be parsing the information through predefined triggers stored in a trigger file 110. Based on the predefined triggers that correspond to the information, queries may be selected from a selection function file 112 that point to functions for employment via the management utility 102. These mining processes, along with others, will be discussed in greater detail hereinafter. Upon completion of mining, and the processes encompassed thereby, a determination of which function should be selected is performed. Based on results of the determination, the system 100 executes the selected function, or management operation(s). These management operations may range from manipulating data or applications on the target devices 108 to updating files retained at a server 101 on which the management utility 102 is embodied.

As discussed above, the system 100 facilitates monitoring target device(s) for information indicating a change in inventory, product state, or an event. Examples of the inventory residing on the target device 108 that may be monitored include OS version and/or application version. Examples of product states that may be monitored include at least the following states in which the target device 108 may reside: initial connection, warm boot, cold boot, or global positioning system (GPS) on/off (e.g., availability on the target device, GPS values, etc.). The events that may be monitored include, for example, whether the device memory is high/low, whether the battery has high/low voltage remaining, whether an invalid battery is engaged, whether an auxiliary device connected/disconnected (e.g., printer, scanner, and the like), whether the settings have changed, and whether new software is installed. Further, the new types and/or identities of target devices, new types of software, new types of queries, and new types of management processes may be recognized from platforms on the target devices 108 at a customer site and incorporated into the system 100. That is, various, and unknown at the time of implementation, inventory, states, and events may be monitored. Accordingly, the system may mine for information related to previously known inventory, states, and events, or the inventory, states, and events that have been created and/or installed on the platforms on the target devices 108 subsequent to their distribution and activation.

In general, the system 100 operates in a dynamic environment whereby new information related to the target devices 108 may be defined (i.e., detected and properly processed) after installation. For instance, new triggers may be defined after an initial installation of software or an operating system occurs at the target devices 108. Accordingly, new management operations can be implemented on the target device 108 post installation or various software. In effect, the system 100 allows user of the target device 108 to define dynamic triggers after initial installation of software onto the target device 108 that cause one or more management operations to be run. These triggers may be invoked when particular pieces of information on the target devices 108 or the information store 130 change or are discovered.

Referring to FIG. 1, the server 101 supports firmware that includes a management utility 102 for communicating with, and enacting management operations directed toward, the target devices 108. In embodiments, the management utility 102 may be loaded on the server 101 or may be distributed to remote devices. In embodiments the server 101 may take the form of various types of computing devices, such as, for example, a personal computer, a desktop computer, a laptop computer, a handheld device (e.g., personal digital assistant), a consumer electronic device, various servers, and the like. It should be noted, however, that the present invention is not limited to implementation on such computing devices, but may be implemented on any of a variety of different types of computing devices within the scope of embodiments of the present invention.

Embodiments of the present invention may be practiced in distributed computing environments where tasks are performed by remote-processing devices that are linked through appropriate connections. In an exemplary embodiment, the management utility 102 typically utilizes a transportation network 104 to reach a host 103. In addition, the management utility 102 may perform a variety of the above-described management operations utilizing the transportation network 104. Connections across the transportation network 104 may be wired or wireless. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components (e.g., the management utility 102 accommodated by the server 101, the host 103, the controller 105, and the target devices 108) are not limited by the examples described, but embrace of a wide variety of methods of communications.

The host 103, as introduced above, may comprise a centralized computing facility for a purchaser of the target devices 108, for example. The host 103 may, in turn, communicate with one or more controllers 105 over the transportation network 104 that in turn facilitates communication with one or more target devices 108 over the transportation network 104. The controller 105 may communicate with one or more of the target devices 108 before information is sent to the management utility 102. It is to be understood that the host 103 may communicate directly with the target devices 108. Further, the management utility 102 may also perform various management operations using the transportation network 104 that affect any of the host 103, the controller 105, and/or the target devices 108.

Figure 4B:
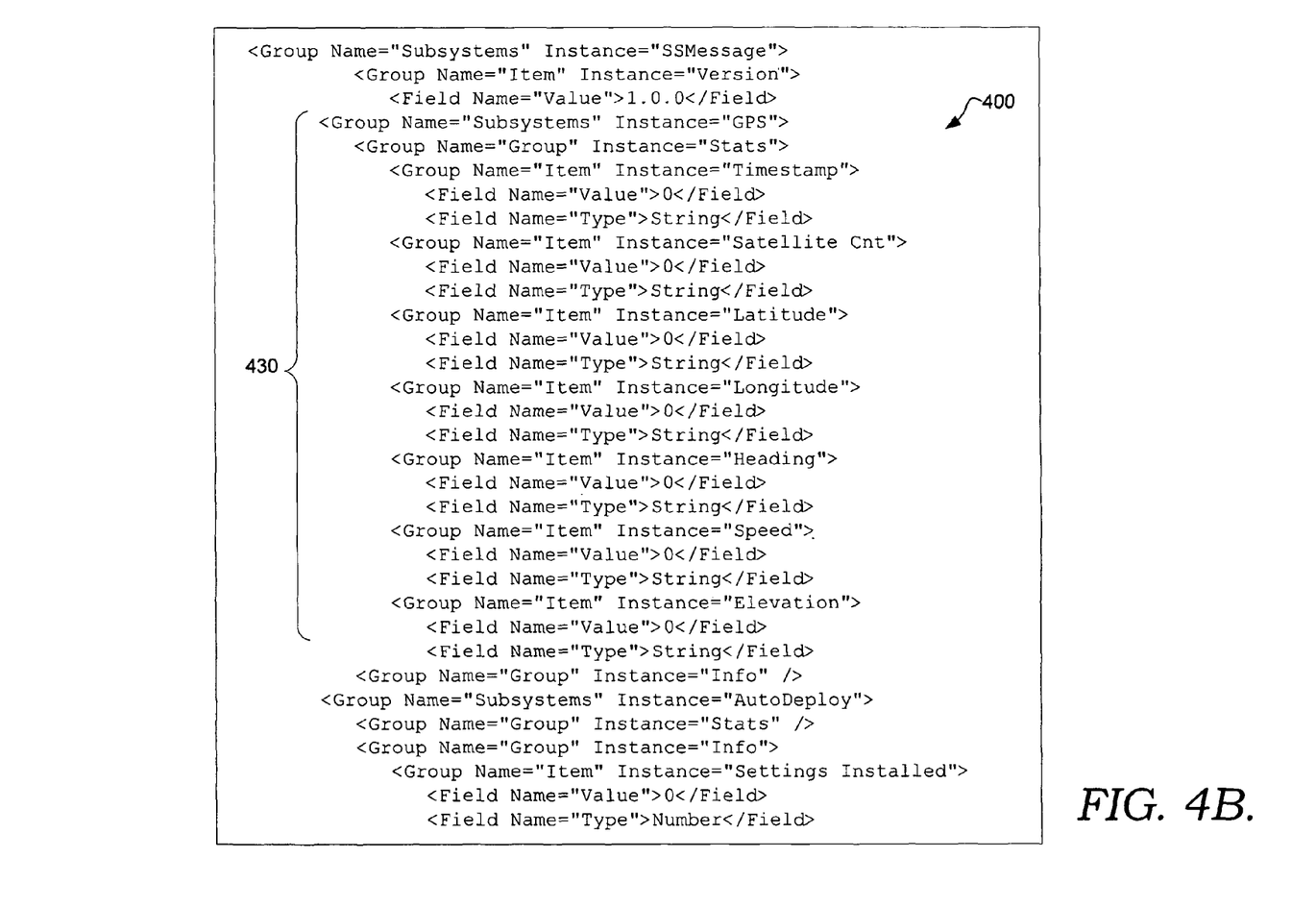

In operation, the management utility 102 initially performs a determination of whether the target device(s) 108 require a management operation, or function at the management utility 102, to be run. In carrying out the determination, the management utility 102 utilizes a selection process that initially queries the inventory, event, and/or state data of the target device 108 or the information store 130. In one instance, querying is performed in response to receiving a message provided by the target devices 108. An exemplary message 400, provided from the target device 108, is depicted in FIGS. 4A-4C, in accordance with an embodiment of the present invention. The target message 400 may include a variety of fields that include a variety of types of information about the target device 108, the application(s) or operating system installed thereon, events, states, inventory, and other characteristics affect the operation of the target device 108. In the exemplary message 400, which is illustrated in an extensible mark-up language (XML) format, there are various fields of information including an identity of the target device 410, a type of the target device 420, a global positioning system (GPS) location/data related to the target device 430, battery properties and level 440, operating system characteristics 450, and storage aspects 460. Although a variety of different types of information within the message 400 have been described, it should be understood and appreciated by those of ordinary skill in the art that other types of suitable messages may be received from a target device that have other formats and types of information, and that embodiments of the present invention are not limited to the exemplary message 400 described herein.

Returning to FIG. 1, based on the information (e.g., inventory, event, and/or state data) retrieved in the message from the target device 108, or the information store 130, a query is determined for facilitating selection of a function to run on the server 101. In embodiments, determining a query from information of a message includes one or more of the following steps, in no particular order: loading definitions of trigger events onto the trigger file 110; loading definitions of queries onto the selection function file 112; comparing the information of the message against the trigger events to determine whether a match exists; and if a matching trigger event is discovered, parsing the information of the message with the stored queries. In embodiments, loading the trigger events, and/or the queries, may be accomplished during an initial file-building stage, and/or a later times (e.g., at periodic intervals, upon being invoked by an event, or any known trigger for updating) during the lifecycle of the management utility 102. Accordingly, an extensible system 100 is achieved. In one instance, the trigger events may be added or updated to the management utility 102 before or after deployment of the management utility 102 or some of the target devices 108. In other embodiments, the definitions of the trigger events may include a scheduled time-based event, a detection of an attribute of one or more of the target devices 108, a recognition of states of one or more of the target devices 108, a recognition of states of a software component residing on one or more of the target devices 108 or the management utility 102. Further, the definitions may originate from a real-time event on another device or system, or be extracted from an information storage system (e.g., information store 130).

In an exemplary embodiment, parsing the information of the message with the stored queries may include several procedures. Upon receiving the message from the target devices 108, parsing may include evaluating the inventory, state, and events of the target devices 108, as indicated in the message, against a listing of loaded queries in the selection function file 112. Upon evaluating these characteristics of the target device 108 in view of the listing of queries, a determination of whether a query corresponds to the characteristics is performed. If a corresponding query is discovered, a mapping process is invoked to ascertain an appropriate management operation to perform at the management utility 102. Accordingly, the selection process employed by the management utility 102, in conjunction with the data stored on the trigger file 110 and the selection function file 112, ties the matching trigger event to a proper management operation to be executed.

In another embodiment of parsing the information of the message with the stored queries, an XML message (see reference numeral 400 of FIGS. 4A-4C) received from the target devices 108 is compared against a list of XPATH queries stored in the selection function file 112. If an XPATH query is selected, in accordance with the XML file, then the mapping process is performed. In this instance, the mapping process identifies associated processes to run and a list of parameters to pass to the management utility 102 to utilize when running the processes. The mapping process may further include selecting a script from the management function file 114 that is associated with the selected XPATH query and that is passed to the management utility for execution.

Figure 2:
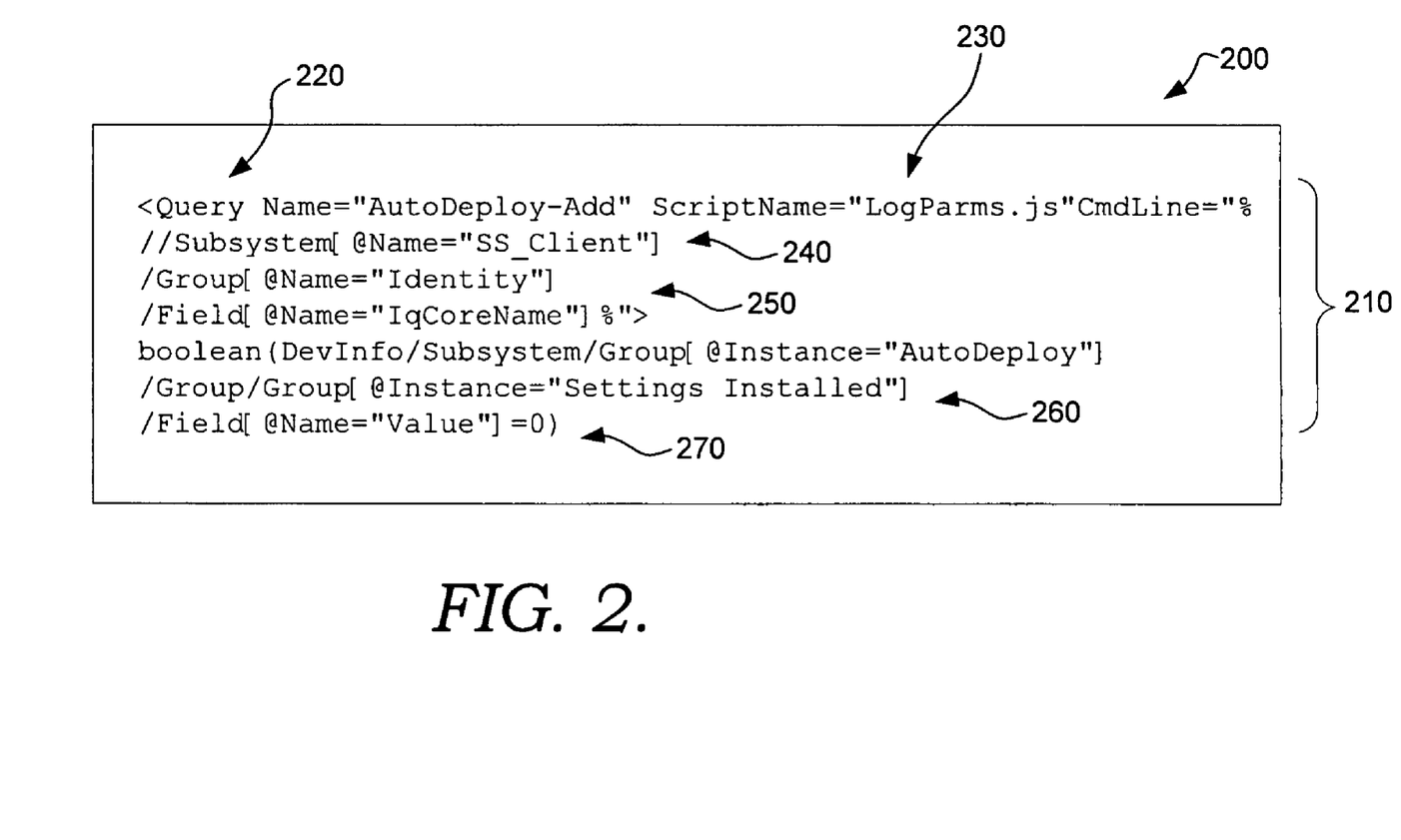
FIG. 2 illustrates an exemplary fragment of a script-selection query, in accordance with an embodiment of the present invention.

In one instance, the identified list of parameters that is passed to the management utility 102 is pulled from the received XML message. By way of example, parsing the message against the XPATH queries reveals passages within the message that are to be passed as line parameters. An exemplary fragment of a script-selection query 200 is depicted in FIG. 2, in accordance with an embodiment of the present invention. This XML fragment contains an element named "query" 210. The query element 210 has both a name 220 and a name of a script 230 to run. It also contains a command-line attribute 240 that has a substitution parameter (e.g., utilizing the parameters extracted from the message). In this case where the substitution parameter exists, an IqCoreName element value 250 is extracted from the received XML message from a target device. However, because the substitution is done using an XPATH query into the XML message, any item from the XML message can be passed to the script. This enables the passing of information not defined at the time of the implementation of the mapping process within the management utility (see reference numeral 102 at FIG. 1). By way of example, when a new application is installed on a target device, it reports itself in an XML message. The substitution ability facilitates forwarding information about the new application from the XML message to the script selected at the management function file (see reference numeral 114 of FIG. 1) utilizing the mapping process. In embodiments, the value of the query element 210 reflects the XPATH query that is comparable against the incoming message XML during parsing. In this case the XPATH query is determined to be comparable if the incoming XML message includes an element with an instance attribute 260 equal to a value of "Settings Installed" and its field element 270 has a value of zero.

The discussion of the selection process, of which the mapping process is part, now resumes with reference to FIG. 1. As discussed above, the process of selecting may include sending the information relating to the inventory, event, and/or state of the target devices 108 to the management utility 102 for processing. Alternatively, the information that may have been gleaned from the target devices 108 (e.g., utilizing the processes associated with mining) may be stored in the information store 130. In this situation, the management utility 102 is instructed to access the information residing on the information store 130. Upon receiving or accessing the information, the information is compared against triggers (e.g., query specifics) aggregated at a trigger file 110. The triggers stored in the trigger file 110, residing on the server 101, may be predefined prior to the target devices 108 of the system 100 being distributed into the field, or the triggers may be later-defined subsequent to the installation of the target devices 108 into the target devices.

The management utility 102 then evaluates the stored information, which may include inventory, state, event data, and other information similar to that being received in the message, by parsing it through the predefined triggers of the trigger file 110 to select functions in the selection function file 112. Based on the process of parsing the stored information, one or more queries may be identified. Each query may include an associated process or processes to be run. In addition, the query may include parameters from the stored information that are not present in the trigger file 110 or the selection function file 112. It is to be understood by those skilled in the art that more complex queries may be supported without departing from the scope of the present invention. Next, the management utility 102 selects a management function or functions stored in a management function file 114 that are associated with the previously identified query. These management functions may be executed at the server 101

(e.g., recovering repair software to cure a failure of the target device 108), may be directed toward the target device 108 (e.g., installing new software on the target device 108), or may be run such that a 3$^{rd}$ party device is affected (e.g., alerting a printer that the target device 108 is in proximity thereto).

Figure 3:
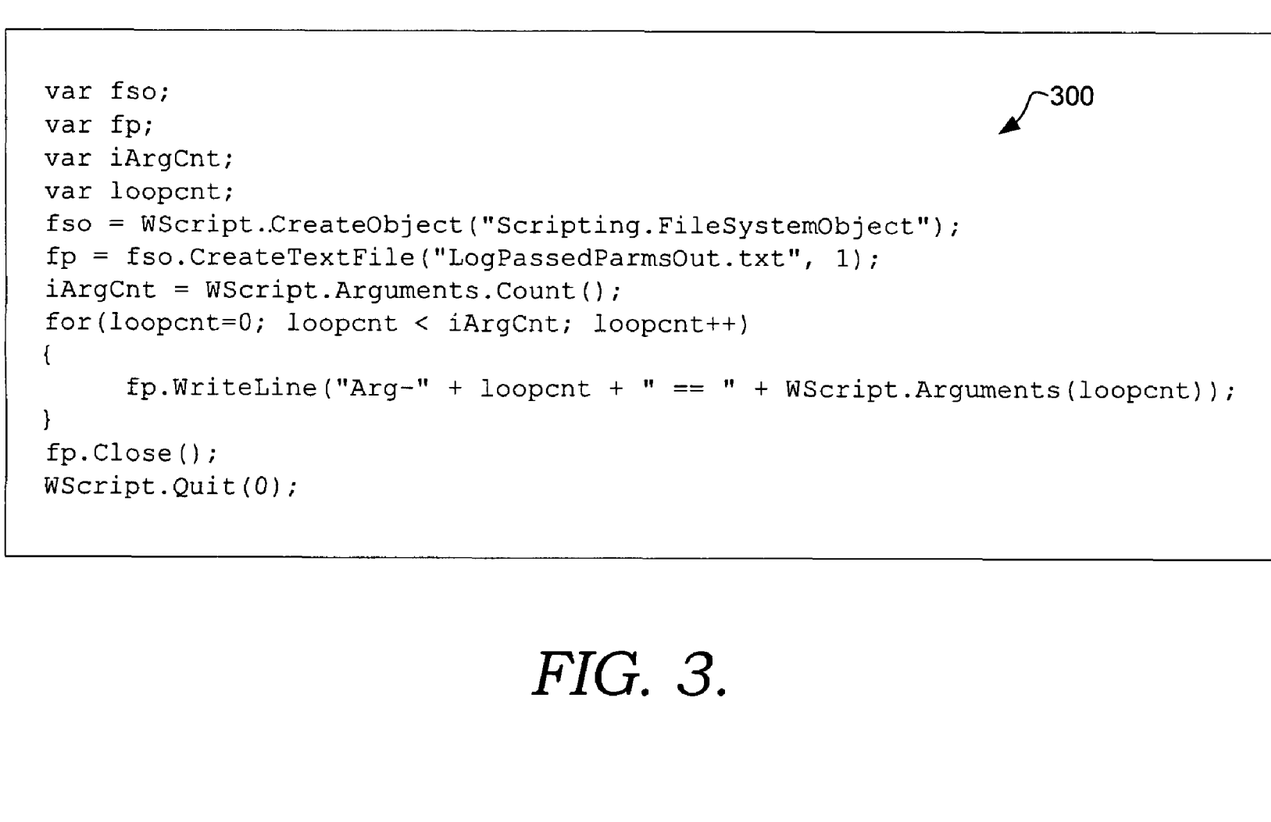
FIG. 3 illustrates an exemplary script, in accordance with an embodiment of the present invention.

The script, which when executed performs a management function, will now be discussed with reference to FIG. 3. In particular, an exemplary script 300 named "LogParms.js" is illustrated in FIG. 3, in accordance with an embodiment of the present invention. This script is identified during the mapping process and selected from the management function file 114 of FIG. 1. Upon selection, the exemplary script 300 may be executed by the management utility 102 of FIG. 1. In embodiments, the script includes logs of parameters from the message, stored information, or portions of the identified query, that it are passed to the management function file 114 of FIG. 1.

Figure 5:
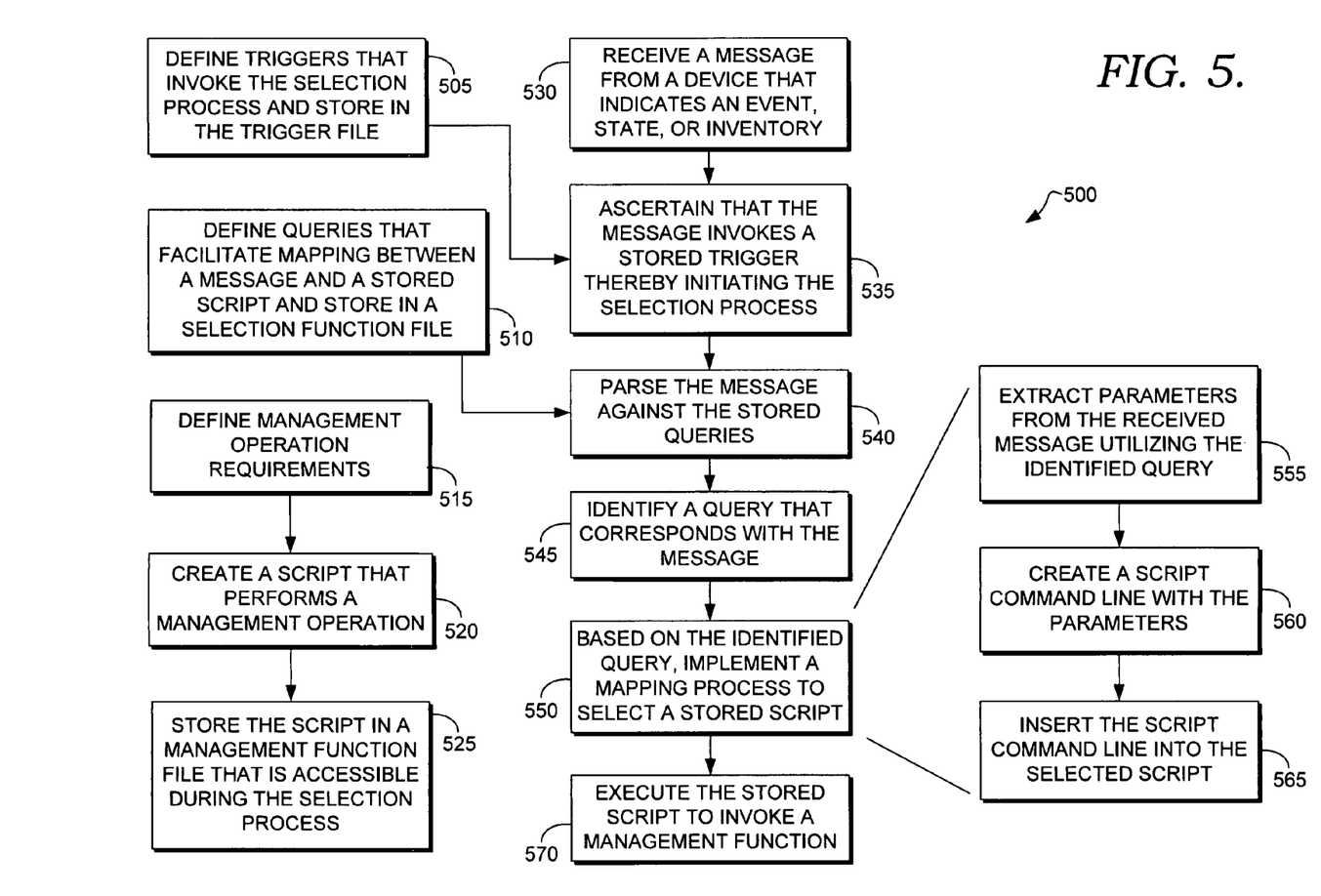
FIG. 5 is a flow diagram illustrating an overall method for managing the target devices, in accordance with an embodiment of the present invention.

Having briefly described an exemplary operating environment for the system 100 of FIG. 1 of the present invention, an exemplary instance of the system employing a method for performing management operations on target devices will now be discussed with reference to FIG. 5. Generally, FIG. 5 is a flow diagram illustrating an overall method 500 for managing products on the target devices (e.g., mobile devices) from the perspective of the management utility 102 of FIG. 1, in accordance with an embodiment of the present invention. Initially, triggers, scripts and queries may be defined and stored in one or more of the files (e.g., files 110, 112, and 114 of FIG. 1) prior or subsequent to the products being installed into the target devices distributed in the field. As depicted at block 505, triggers, or trigger events, are defined that invoke the selection process. These triggers may be stored in a trigger file on a server. As depicted at block 510, queries that facilitate mapping between a message and a stored script may be defined and stored in a selection function file. Requirements of a management operation may be defined, and a script that performs the management operation may be created. These steps are depicted in blocks 515 and 520. As indication at block 525, the script is stored in a management operation file that is accessible during the selection process.

Upon building, and/or updating, the files that are accessible to the management utility, messages from the target devices, or data related to the target device mined from an information store, may be processed. Initially, a message may be received from a target device, as depicted at block 530. In other embodiments, monitoring the target devices may include, beyond detecting messages therefrom, accessing information at an information store or mining other data from various sources. Data mining may further include the processes of collecting data from various other devices and reporting collected data, messages, and other information to the management utility. Once reported, the management utility is adapted to act on the mined data, and in particular, to changes in the state, events, and inventory of the target devices.

As depicted at block 535, a management utility may ascertain that, upon comparing information within the message against the stored triggers, that the message invokes a stored trigger. Accordingly, the selection process may be launched to select an appropriate script to execute. As depicted at blocks 540 and 545, the message is parsed against the stored queries and a query is identified that corresponds with the message.

As depicted at block 550, a mapping process to select an appropriate stored script is implemented in accordance with the identified query. In embodiments, the mapping process may include extracting parameters from the receive message utilizing the identified query (see block 555), creating a script command line with the extracted parameters (see block 560), and inserting the script command line into the selected script (see block 565). As depicted at block 570, the stored script selected by the selection process is executed to invoke the management function. As such, the system of the present invention employs a method that enables flexibility in the selection of management operations and in the configuration of possible processes, thereby accommodating different customers needs related to the inventory, state, or events on their target device. Further, the method of the present invention may provide for quick adaptation to an individual customers' needs.

The following are three additional exemplary embodiments of implementations of the method for managing operations of a target device. In the first exemplary embodiment, a target device may capture a particular type of communication channel when communicating with a host (e.g., the host 103 of FIG. 1). Information related to the captured channel may be communicated to a management utility via a message from the target device. Based on the information in the message, a management operation to effect a download of software to enable use of the particular channel may be triggered. But, in order to effect a management operation, a trigger should typically be invoked. The trigger may be complex, as in this case. Here, the trigger facilitates determining whether a cost for updating the target device via a download would be justified, as opposed to the costs associated with waiting for a different connection channel. As such, a trigger may not be invoked until the target device attempts to capture the particular channel a predefined number of times, utilizing a trend analysis tool relying on mined data related to the subject target device. Accordingly, if the device has only recently attempted to connect to the host via the particular channel, and typically connects to the management utility through a WAN, then the trigger is not invoked, thereby deferring the unnecessary expense of downloading an upgrade. Alternatively, if the trends of the target device trends indicate the target device frequently attempts to contact the host via the particular channel, then the trigger may be invoked that selects the corresponding management operation. As discussed above, the management operation, when launched, downloads and installs the upgrade to the target device.

In the second exemplary embodiment for implementing a method of the present invention, printer selection for the target device is automatically performed by the management utility. Initially, the management utility may receive a message from the target device by querying the GPS location of the target device. The GPS location in the message will invoke a trigger to select a proper management operation. In this instance, the proper management operation instructions the printer most proximate to the target device to route printer data to the target device. In addition, the management operation may send a message to the target device to alert a user thereof as to which printer is selected for receiving print commands. Because the management utility may be configured to frequently initiate queries to the target device, the GPS location of the target device may be continuously monitored. Accordingly, the management utility may appropriately update the target device with printer data as it is moved about a facility, and in and out of ranges of printers therein.

In the third exemplary embodiment, the target device may convey information to the management utility, wherein the information is related to failed functions. As target devices come on line via a reboot, for example, a first predefined trigger may be invoked. This first predefined trigger may be mapped to a script that, when executed, updates the target device with a latest version of firmware. Upon updating the target device, the management utility may continue to mine data from the target device. One of the mined pieces of data may comprise the success or failure of the firmware update. A second predefined trigger may be invoked upon detecting, via the mined data, that the firmware update failed in the target device a certain number of time, a certain percentage of times, and the like. In another instance, the second predefined trigger may be invoked upon detecting that the firmware update failed on a threshold number of target devices. This second predefined trigger may be mapped to script that, when executed, forwards information about the failures to a product support network. This could result in the product support network correcting the failing firmware updates and releasing a newly patched firmware. A third trigger may be subsequently defined and stored to the trigger file that is invoked upon detecting the target device, with the failing firmware update, coming online. This third newly defined trigger may be mapped to a script that, when executed, installs the newly patched firmware on the target device. Accordingly, the use of the triggers and management operation may provide a self-correcting management environment.

In conclusion, it will be apparent to one of ordinary skill in the art that the details presented above are beyond what is necessary to practice the present invention. As is evident from the description provided above, the implementation of the present invention varies greatly depending on the circumstances surrounding the implementation. Many variations, implementations and combinations are envisioned and disclosed. The scope of the present invention is intended to cover all variations, omissions, substitutions and combinations which are and which may become apparent from the disclosed embodiments. The scope of the invention should be extended to the claimed invention and all of its equivalents.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A system for providing managing functions on a client device, the system comprising:
   the client device having memory for storing software;
   a server having memory for storing at least one trigger, at least one selection function file, and management functions selectively executable by the client device;
   a network providing data communication between the server and the client device; and
   a server utility stored on the server and executable thereon, the server utility capable of evaluating a set of data retrieved from one of the client device and a database stored on the server, the server utility further configured to compare the at least one trigger against information within the set of data to determine a match, and, when a match exists, to initiate a selection process comprising:
   (a) parsing the information within the set of data using queries in the at least one selection function file;
   (b) identifying one of the queries that corresponds with a portion of the parsed information;
   (c) selecting one of the management functions mapped to the identified query to be run based on the set of data; and
   (d) storing the selected one of the mapped management functions to an information store;
   when there exists no match between the at least one trigger and information within the set of data upon comparison, the server utility configured to evaluate another set of data retrieved from one of the client device and a database stored on the server.

2. The system of claim 1, wherein the client device periodically contacts the server to provide the set of data within a message.

3. The system of claim 1, wherein the set of data in the database comprises data pertaining to one or more of a change in inventory, a change in product state, or an event.

4. The system of claim 3, wherein the change in inventory comprises at least one of a change in OS version or a change in application version.

5. The system of claim 3, wherein the change in product state comprises at least one of a change in initial connection, warm boot, cold boot, or GPS position.

6. The system of claim 3, wherein the event comprises at least one of a memory low state, a battery low state, an invalid battery state, a child device state, a settings changed state, or a new software installed state.

7. The system of claim 3, wherein the server utility is capable of organizing a plurality of client devices into a logical group and capable of allowing for the event to initiate execution of the selected one of the management functions on each of the plurality of client devices in the logical group.

8. The system of claim 1, wherein the client device is scheduled to contact the server at one of a requested time or a predefined event.

9. The system of claim 1, wherein the least one trigger, the queries within the at least one selection function file, and the management functions are defined upon a distribution of the client device to a user.

10. The system of claim 1, wherein the least one trigger, the queries within the at least one selection function file, and the management functions are defined after a distribution of the client device to a user.

11. The system of claim 1, wherein the client device is further configured to send an XML message carrying the set of data to the server, and wherein the server utility extracts the at least one trigger and the at least one selection function file from data mined from the XML message.

12. The system of claim 11, wherein the server utility sends a script file through a communication channel to the client device for execution by the client device.

13. The system of claim 12, wherein running the selected management function involves the server utility passing command line parameters within the script file, wherein the command line parameters are pulled from the incoming XML message.

14. A method performed by a server for managing a client device, the client device having memory for storing software, the method comprising:
   defining at least one trigger, at least one selection function file, and one or more management functions, wherein the one or more management functions are applied upon, at least, the client device;

receiving information particular to the client device, the information pertaining to one or more of a change in inventory, a change in product state, or an occurrence of an event;

comparing the at least one trigger against the received information to determine whether the at least one trigger is invoked by contents of the received information; and when the at least one trigger is invoked, using the server to perform a selection process comprising:
- (a) parsing the information within the set of data using queries in the at least one selection function file, wherein the utilized queries are associated with the at least one invoked trigger;
- (b) identifying one of the queries that corresponds with the contents of the parsed information;
- (c) selecting the one or more management functions mapped to the identified query; and
- (d) executing the one or more selected management functions upon, at least, the client device.

15. The method of claim 14, wherein receiving information particular to the client device comprises mining an information database for characteristics of the client device.

16. The method of claim 14, wherein receiving information particular to the client device comprises the following steps:
receiving an XML message from the client device; and
mining the information within the XML message pertaining to one or more of a change in inventory, a change in product state, or an event.

17. The method of claim 16, further comprising passing command line parameters extracted from the received XML message within the script file.

18. The method of claim 14, further comprising sending a script file through a communication channel to the client device for execution by the client device.

19. A selection process executed by a computing device, the selection process comprising:

providing triggers that are specifically defined for a target device, which is in communication with the computing device;

creating a script that performs a management operation;

providing queries that map between data accessible to the computing device and the management operation, wherein each of the queries are associated with at least one of the triggers, respectively;

receiving a message from the target device, wherein the message includes information pertaining to at least one of a change in inventory, a change in product state, or an occurrence of an event;

determining that a portion of the information invokes one or more of the triggers upon comparing the triggers with the received message;

parsing the portion of information using the queries associated with the one or more invoked triggers;

identifying one of the associated queries that is satisfied by the parsed portion of information; and when the management operation is mapped to the identified query, performing a mapping process comprising:
- (a) extracting parameters from the received message using the identified query;
- (b) composing a script command line from the extracted parameters in combination with the script that performs the management function; and
- (c) inserting the script command line with a communication that is returned to the target device.

* * * * *